United States Patent
Yang et al.

(10) Patent No.: US 12,388,346 B2
(45) Date of Patent: Aug. 12, 2025

(54) POWER CONVERTER WITH REDUCED POWER CONSUMPTION AND METHOD OF OPERATING THE SAME

(71) Applicant: DELTA ELECTRONICS, INC., Taoyuan (TW)

(72) Inventors: Shang-Kay Yang, Taoyuan (TW); Hsien-Kai Wang, Taoyuan (TW); Yen-Wei Lin, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 322 days.

(21) Appl. No.: 18/300,190

(22) Filed: Apr. 13, 2023

(65) Prior Publication Data

US 2024/0178740 A1 May 30, 2024

(30) Foreign Application Priority Data

Nov. 25, 2022 (CN) .......................... 202211490928.3

(51) Int. Cl.
*H02M 1/08* (2006.01)
*H02M 1/00* (2006.01)
*H02M 1/42* (2007.01)

(52) U.S. Cl.
CPC ....... *H02M 1/0054* (2021.05); *H02M 1/0035* (2021.05); *H02M 1/08* (2013.01); *H02M 1/4233* (2013.01)

(58) Field of Classification Search
CPC .... H02M 1/0054; H02M 1/0035; H02M 1/08; H02M 1/4233
See application file for complete search history.

(56) References Cited

U.S. PATENT DOCUMENTS

| | | |
|---|---|---|
| 2017/0302157 A1 | 10/2017 | Lin et al. |
| 2020/0335983 A1 | 10/2020 | Long et al. |
| 2022/0131470 A1 | 4/2022 | Sagneri et al. |
| 2024/0195291 A1* | 6/2024 | Yang .................. H02M 1/4208 |

OTHER PUBLICATIONS

Office Action dated Nov. 21, 2023 of the corresponding Taiwan patent application No. 111145126.

* cited by examiner

*Primary Examiner* — Adolf D Berhane
(74) *Attorney, Agent, or Firm* — MUNCY, GEISSLER, OLDS & LOWE, P.C.

(57) ABSTRACT

A power converter with reduced power consumption receives an input voltage and provides an output voltage to supply power to a load. The power converter includes a power factor correction circuit, a driver circuit, and a controller. The power factor correction circuit includes at least one inductor and an output capacitor. When the controller determines that an effective value of an input current is correspondingly lower than a current lower limit, a specific time period starts based on the output voltage reaching a voltage lower limit, and the specific time period ends based on the output voltage reaching a voltage upper limit. In the specific time period, the controller enables the driver circuit based on the input current being correspondingly greater than a predetermined threshold so as to continuously transfer the energy stored in the at least one inductor to the output capacitor.

15 Claims, 8 Drawing Sheets

POWER CONVERTER WITH REDUCED POWER CONSUMPTION AND METHOD OF OPERATING THE SAME

BACKGROUND

Technical Field

The present disclosure relates to a power converter and a method of operating the same, and more particularly to a power converter with reduced power consumption and a method of operating the same.

Description of Related Art

The statements in this section merely provide background information related to the present disclosure and do not necessarily constitute prior art.

Due to the rapid development of the information industry in recent years, the power supply plays an important role, and the power consumption of information or home appliances is gradually required to be reduced to a certain value under no-load operation or light-load operation. On the other hand, since harmonic suppression has classified limits in the international standard IEC61000-3-2, and stipulates the maximum rated harmonic current, information or home appliances must be equipped with power converters with power factor correction functions so as to improve the power factor of the AC power supply.

Since the general power converter with power factor correction function is under no load, in order to maintain the output voltage, the magnitude of the PWM signal follows the control value of the controller (as shown in FIG. 1). When the instantaneous value of the input voltage appears at a lower input voltage Vin (usually near the zero-crossing point), the energy transferred will be very low (i.e., Vin(wt) *Iin). The power converter needs to output more pulses (corresponding to the inductor current Il) to stabilize the output voltage Vout, resulting in increased driving loss of the power converter. Similarly, since the power converter needs to output more pulses when the instantaneous value of the input voltage appears at a lower input voltage Vin, the conversion efficiency of the current power converter will be poor, and additional power consumption will be increased.

Accordingly, a power converter with reduced power consumption and a method of operating the same are provided to improve the conversion efficiency of the power factor correction circuit and reduce the driving loss of the power converter under no-load operation or light-load operation.

SUMMARY

In order to solve the above-mentioned problems, the preset disclosure provides a power converter with reduced power consumption. The power converter with reduced power consumption includes a power factor correction circuit, a driver circuit, and a controller. The power factor correction circuit includes at least one inductor, at least one power switch, and an output capacitor, and receives the input voltage. The driver circuit is coupled to the at least one power switch. The controller is coupled to the driver circuit, and provides a PWM signal to the driver circuit. The driver circuit drives the switching of the at least one power switch based on the PWM signal so as to control the power factor correction circuit to convert the input voltage into the output voltage. When the controller determines that an effective value of an input current of the power factor correction circuit is correspondingly lower than a current lower limit, a specific time period starts based on the output voltage reaching a voltage lower limit, and the specific time period ends based on the output voltage reaching a voltage upper limit. In the specific time period, the controller enables the driver circuit based on the input current being correspondingly greater than a predetermined threshold so as to operate the switching of the at least one power switch through the PWM signal.

In order to solve the above-mentioned problems, the preset disclosure provides a method of operating a power converter with reduced power consumption. The power converter receives an input voltage and provides an output voltage to supply power to a load. The power converter includes a power factor correction circuit and a driver circuit, and the power factor correction circuit includes at least one inductor, at least one power switch, and an output capacitor. The method includes steps of: (a) determining that an effective value of an input current of the power factor correction circuit is correspondingly less than a current lower limit; (a1) starting a specific time period when the output voltage reaches a voltage lower limit; (a11) enabling the driver circuit when the input current is correspondingly greater than a predetermined threshold to provide a PWM signal to drive the switching of the at least one power switch; (a12) disabling the driver circuit when the input current is correspondingly lower than the predetermined threshold; and (a2) ending the specific time period when the output voltage reaches a voltage upper limit.

The main purpose and function of the present disclosure is to provide a method for controlling a conduction phase angle interval of the input current. When the load is light to a certain extent (i.e., no load or light load), the method of burst control of the output voltage (i.e., the burst mode) is used to make the input current reach near the peak value of the input voltage so that when the input current reaches near the peak value of the input voltage, the driver circuit is enabled. Therefore, the controller may only operate the switching of the power switches when the driver circuit is enabled so that the energy stored in the inductor can be effectively transferred to the output capacitor. Especially when the power factor correction circuit is under no-load condition or light-load condition, and the input current is not high, the effect is even more remarkable. Therefore, the power converter and its operating method of the present disclosure can achieve the effect of increasing the efficiency of the power factor correction circuit and reducing the driving loss of the power factor correction circuit when it is under no-load operation or light-load operation.

It is to be understood that both the foregoing general description and the following detailed description are exemplary, and are intended to provide further explanation of the present disclosure as claimed. Other advantages and features of the present disclosure will be apparent from the following description, drawings, and claims.

BRIEF DESCRIPTION OF DRAWINGS

The present disclosure can be more fully understood by reading the following detailed description of the embodiment, with reference made to the accompanying drawing as follows.

DETAILED DESCRIPTION

Figure 1:
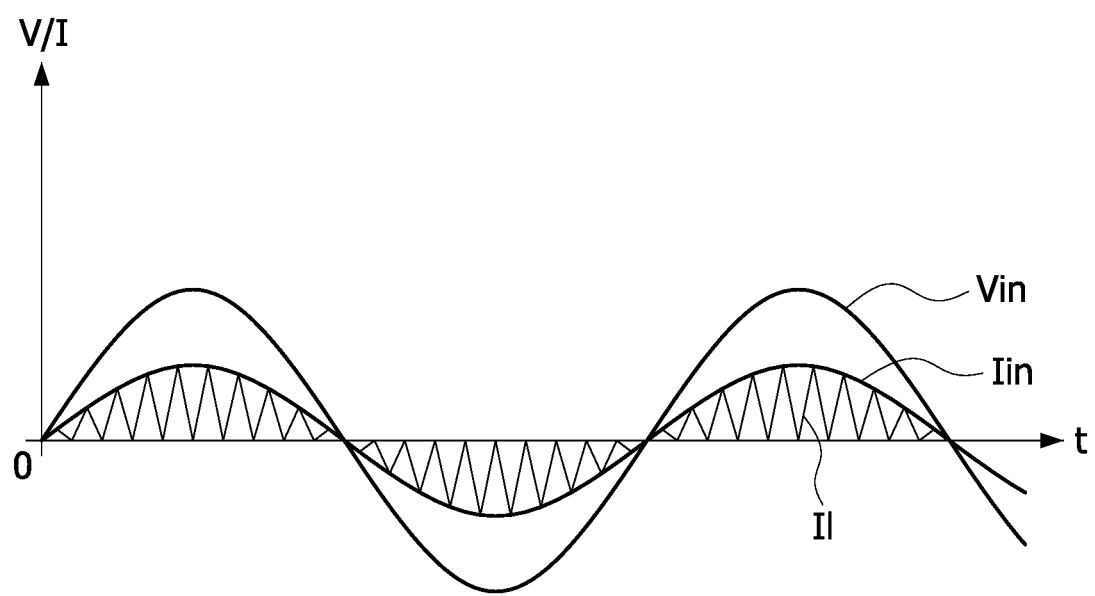
FIG. 1 is a waveform diagram of power factor correction of a conventional power converter.

Reference will now be made to the drawing figures to describe the present disclosure in detail. It will be understood that the drawing figures and exemplified embodiments of present disclosure are not limited to the details thereof.

Figure 2A:
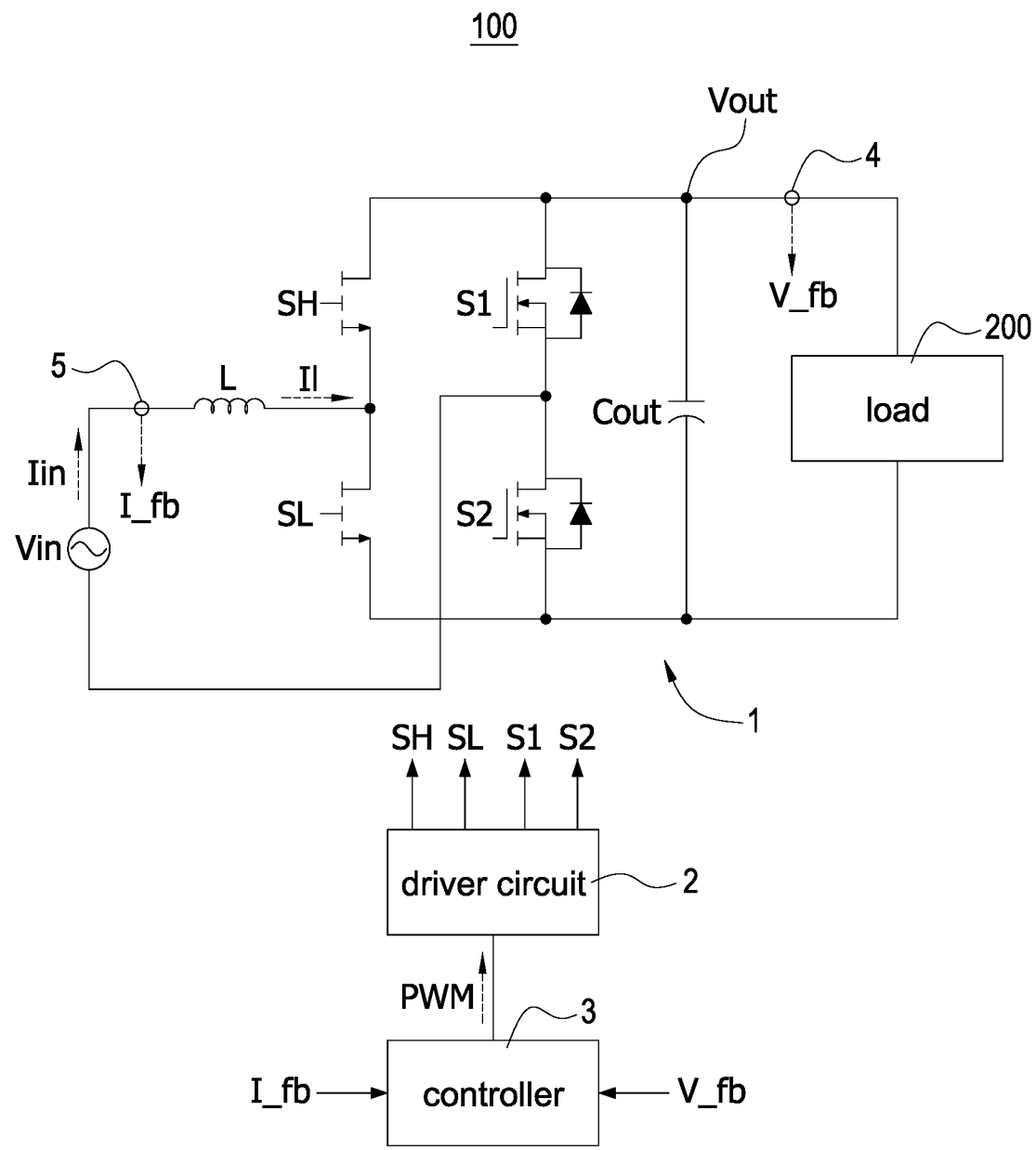
FIG. 2A is a block circuit diagram of a power converter with reduced power consumption according to the present disclosure.

Please refer to FIG. 2A, which shows a block circuit diagram of a power converter with reduced power consumption according to the present disclosure, and also refer to FIG. 1. The power converter 100 receives an input voltage Vin and provides an output voltage Vout to supply power to a load 200. The power converter 100 includes a power factor correction circuit 1, a driver circuit 2, and a controller 3. The power factor correction circuit 1 includes at least one inductor L, at least one switch (SH, SL, S1, S2), and an output capacitor Cout. Take a circuit structure of FIG. 2A as an example, the inductor L is coupled at an input end of the power factor correction circuit 1 and receives the input voltage Vin. The output capacitor Cout is coupled at an output end of the power factor correction circuit 1 and coupled to the load 200 to provide the output voltage Vout to supply power to the load 200. The power switches (SH, SL, S1, S2) are coupled between the inductor L and the output capacitor Co, and the driver circuit 2 is coupled between the controller 3 and the power switches (SH, SL, S1, S2).

The power converter 100 further includes a voltage detection circuit 4 and a current detection circuit 5. The voltage detection circuit 4 is coupled between the output capacitor Cout and the controller 3, and the current detection circuit 5 is coupled between the power factor correction circuit 1 and the controller 3. The voltage detection circuit 4 detects the output voltage Vout to provide a first feedback voltage V_fb corresponding to the output voltage Vout to the controller 3. The current detection circuit 5 detects an input current Iin flowing through the input end of the power factor correction circuit 1 to provide a second feedback voltage I_fb corresponding to the input current Iin to the controller 3. The controller 3 modulates a PWM (pulse-width modulation) signal PWM based on the first feedback voltage V_fb and the second feedback voltage I_fb and provides the PWM signal PWM to the driver circuit 2.

The driver circuit 2 receives the PWM signal PWM and drives power switches (SH, SL, S1, S2) to switch turning on and turning off based on the PWM signal PWM. Therefore, the driver circuit 2 drives the switching of the power switches (SH, SL, S1, S2) based on the PWM signal PWM so as to control the power factor correction circuit 1 converting the input voltage Vin into the output voltage Vout. In one embodiment, the circuit structure of the power factor correction circuit 1 shown in FIG. 2A is only a schematic example. The power factor correction circuit 1 may use different circuit structures according to the requirements of the power converter 100. Therefore, all AC/DC conversion circuits that may be used as the power factor correction circuit 1 should be included in the scope of the present embodiment, and the detail description is omitted here for conciseness.

Figure 2B:
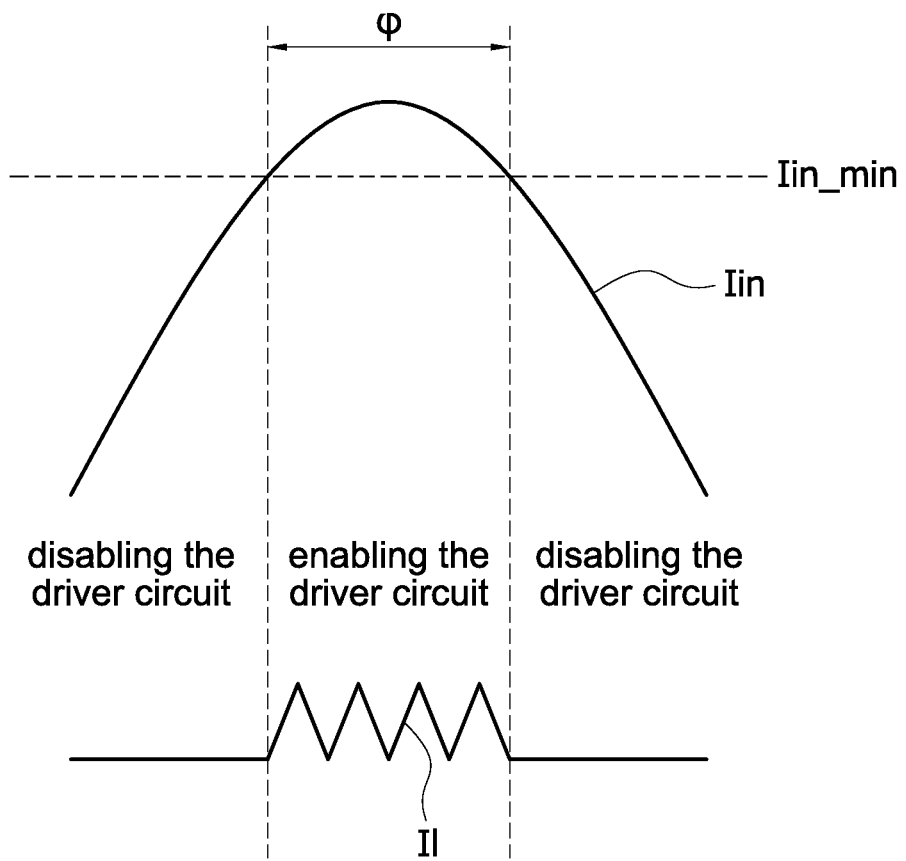
FIG. 2B is a schematic diagram of power consumption reduction of the power converter according to the present disclosure.

Please refer to FIG. 2B, which shows a schematic diagram of power consumption reduction of the power converter according to the present disclosure, and also refer to FIG. 2A. With respect to the related art of FIG. 1, if the power factor correction circuit 1 can reach or near the highest (peak) point of the mains voltage (that is, the instantaneous voltage value of the input voltage Vin is the peak value), and then transfer the energy to the output end, not only the efficiency of the power factor correction circuit 1 can be increased, but also the driving loss of the power factor correction circuit 1 at no load or light load can be reduced. Therefore, the main purpose and function of the present disclosure is to provide a method for controlling the conduction phase angle interval φ of the input current Iin. The conduction phase angle interval φ takes the peak value of the input voltage Vin as the center to set the predetermined threshold Iin_min. When the load is light to a certain extent (i.e., no load or light load), the method of burst control of the output voltage Vout (i.e., the burst mode) is used to make the input current Iin reach near the peak value of the input voltage Vin so that when the input current Iin reaches near the peak value of the input voltage Vin, the driver circuit 2 is enabled, and the driver circuit 2 is disabled for the rest of the time.

Therefore, the controller 3 may only operate the switching of the power switches (SH, SL, S1, S2) when the driver circuit 2 is enabled so that the energy stored in the inductor L can be effectively transferred to the output capacitor Cout. In other words, when the input current Iin is greater than the predetermined threshold Iin_min, the inductor L generates the inductor current Il to transfer the energy stored in the inductor L to the output capacitor Cout, and during the period when the remaining input current Iin is lower than the predetermined threshold Iin_min, there is no generation of inductor current. Therefore, the energy transfer of the inductor L may be made more efficient, especially when the power factor correction circuit 1 is under no-load condition or light-load condition, and the input current Iin is not high, the effect is even more remarkable. Therefore, the power converter 100 and its operating method of the present disclosure can achieve the effect of increasing the efficiency of the power factor correction circuit 1 and reducing the driving loss of the power factor correction circuit 1 when it is under no-load operation or light-load operation.

Figure 3:
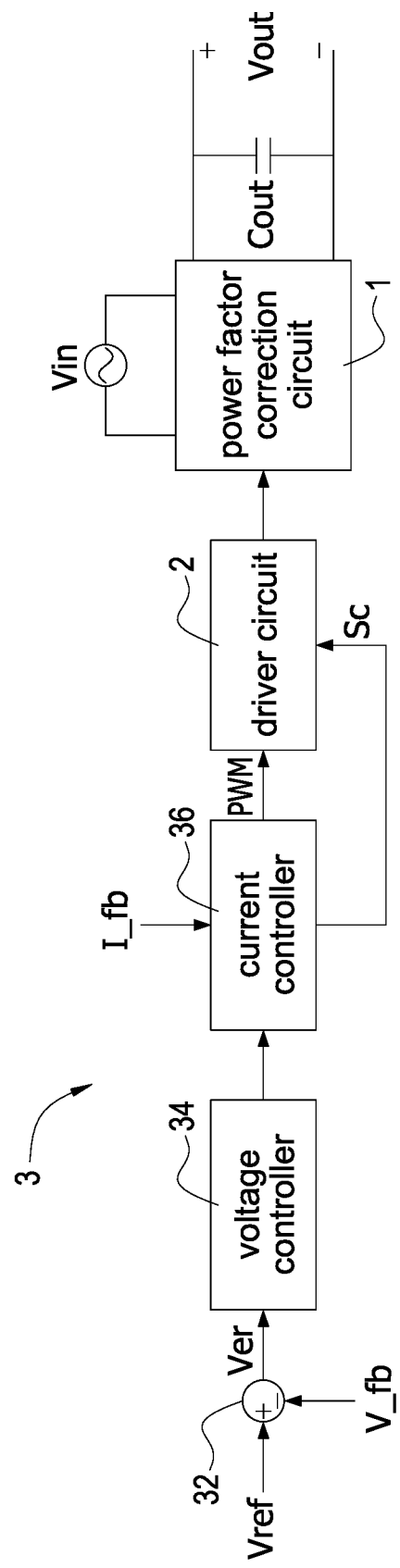
FIG. 3 is a block circuit diagram of a controller according to the present disclosure.

Please refer to FIG. 3, which shows a block circuit diagram of a controller according to the present disclosure, and also refer to FIG. 2A and FIG. 2B. The controller 3 includes an error amplifier 32, a voltage controller 34, and a current controller 36. The error amplifier 32 is coupled to the output capacitor Cout through the voltage detection circuit 4 to receive the first feedback voltage V_fb corresponding to the output voltage Vout. The error amplifier 32 generates an error signal Ver based on the first feedback voltage V_fb and a reference voltage Vref. The voltage controller 34 is coupled to the error amplifier 32 to receive the error signal Ver. The voltage controller 34 generates a voltage command Vc based on the error signal Ver. The current controller 36 is coupled to the voltage controller 34 to receive the voltage command Vc. The current controller 36 modulates and generates the PWM signal PWM to provide the PWM signal PWM to the driver circuit 2. Therefore, the frequency/duty ratio of the PWM signal PWM is mainly determined by the voltage command Vc, and the driver circuit 2 operates the switching of the power switches (SH, SL, S1, S2) based on the PWM signal PWM.

Furthermore, corresponding to the purpose and effect mentioned in the above, the current controller 36 is further coupled to the current detection circuit 5 to receive the second feedback voltage I_fb corresponding to the input current Iin. The current controller 36 generates a first current command Iin_rms_ref corresponding to an effective value of the input current Iin based on the second feedback voltage I_fb (corresponding to the input current Iin). The first current command Iin_rms_ref is proportional to the effective value of the input current Iin (that is, a root-mean-square value of the input current Iin), and is combined with the voltage command Vc as a DC current control command for the next cycle. The current controller 36 further generates a second current command Iin_ref corresponding to a current waveform of the input current Iin based on the second feedback voltage I_fb (corresponding to the input current Iin). The second current command Iin_ref is proportional to an instantaneous value of the input current Iin, and is combined with the voltage command Vc as an AC sinusoidal current control command for the next cycle. Based on conservation of energy, by sampling the output voltage Vout and the input current Iin, the loading of the back-end load 200 can be reflected, and therefore it can be determined whether the loading of the load 200 is at no load (light load), medium load, or heavy load. In addition, the controller 3 can preset parameters such as the current lower limit, the current upper limit, and the predetermined threshold based on the circuit specifications of the power factor correction circuit 1 for subsequent operation of the driver circuit 2.

Therefore, the current controller 36 can determine whether to enable or disable the driver circuit 2 by providing the control signal Sc through the voltage command Vc, the second feedback voltage I_fb, and the parameters set above. In one embodiment, the current lower limit, the current upper limit, and the predetermined threshold may preferably be preset by the current controller 36 based on the voltage command Vc, the second feedback voltage I_fb, and the circuit specifications of the power factor correction circuit 1, but not limited to this.

Figure 4:
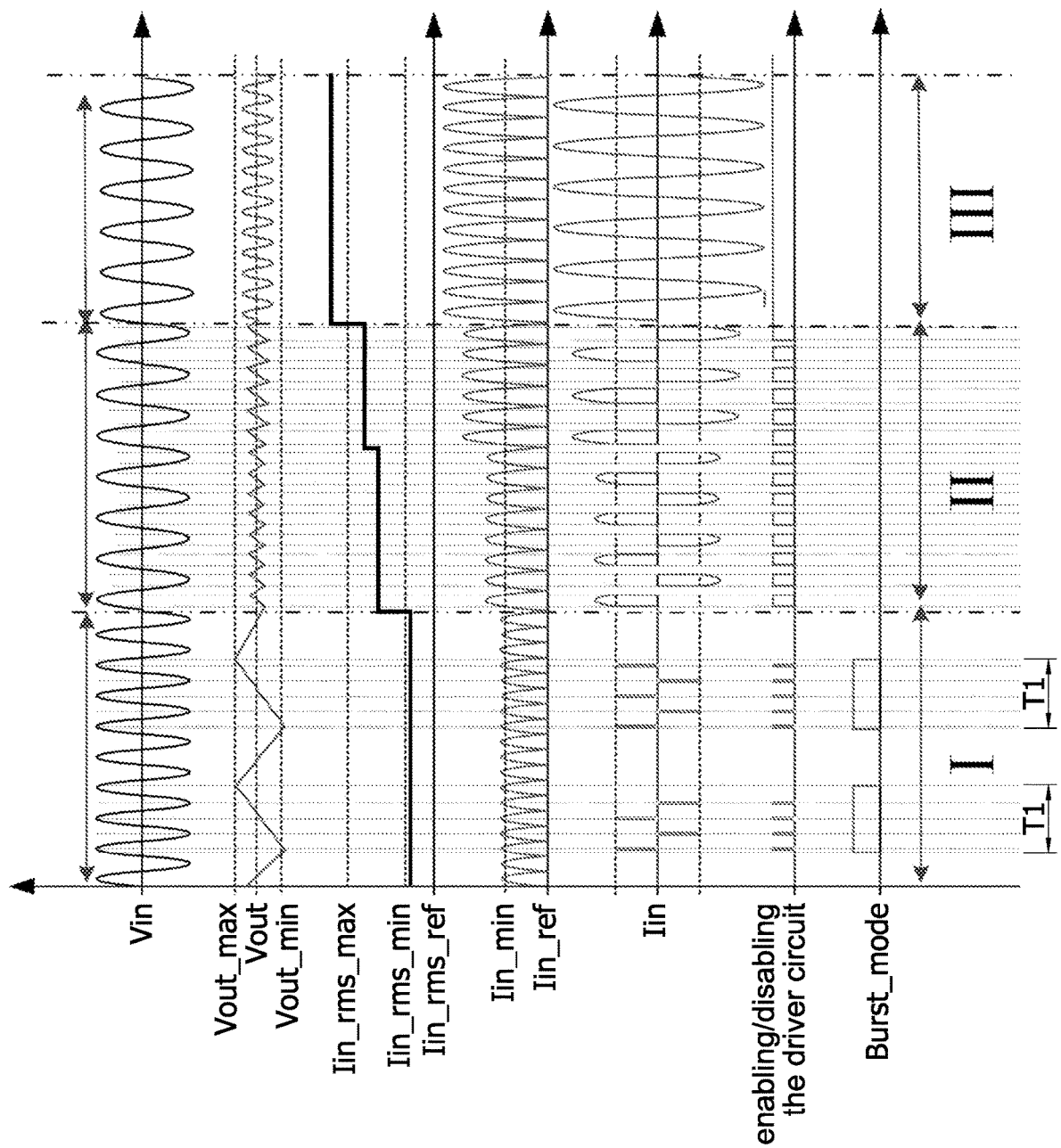
FIG. 4 is an operation sequence diagram of the power converter according to the present disclosure.

Please refer to FIG. 4, which shows an operation sequence diagram of the power converter according to the present disclosure, and also refer to FIG. 2A to FIG. 3. In FIG. 4, three intervals (I, II, III) are shown, and the three intervals respectively correspond to the timings when the power converter 100 operates at no load (light load), medium load, and heavy load. The controller 3 presets parameters such as the current lower limit Iin_rms_min, the current upper limit Iin_rms_max, and the predetermined threshold Iin_min based on the circuit specifications of the power factor correction circuit 1. The current controller 36 mainly determines whether the effective value of the input current Iin is correspondingly lower than the current lower limit Iin_rms_min through the first current command Iin_rms_ref, and determines whether the instantaneous value of the input current Iin is correspondingly greater than the predetermined threshold Iin_min so as to perform corresponding operations.

In the interval I, the current controller 36 determines that the effective value of the input current Iin of the power factor correction circuit 1 is correspondingly lower than the current lower limit Iin_rms_min based on the first current command Iin_rms_ref, that is, it indicates that the power factor correction circuit 1 operates under no-load condition or light-load condition. Therefore, the controller 3 operates in a burst mode. The operation of the burst mode is that the controller 3 controls the PWM signal PWM to generate pulses in a specific time period T1, and does not generate pulses in other time periods so that the power converter 100 save power consumption when operating in the no-load or the light-load condition. In one embodiment, the manner of setting the start/end of the specific time period T1 is based on the magnitude of the output voltage Vout. When the output voltage Vout reaches a voltage lower limit Vout_min, the specific time period T1 starts, and when the output voltage Vout reaches a voltage upper limit Vout_max, the specific time period T1 ends.

Also refer to FIG. 2B, in the specific time period T1, when the current controller 36 of the controller 3 determines that the instantaneous value of the input current Iin of the power factor correction circuit 1 is correspondingly greater than the predetermined threshold Iin_min through the second current command Iin_ref, the driver circuit 2 is enabled. When the driver circuit 2 is enabled, the driver circuit 2 drives the power switches (SH, SL, S1, S2) based on the pulse wave of the PWM signal PWM to operate the switching of the power switches (SH, SL, S1, S2) so that the energy stored in the inductor L is transferred to the output capacitor Cout. Conversely, when the current controller 36 determines that the instantaneous value of the input current Iin of the power factor correction circuit 1 is correspondingly lower than the predetermined threshold Iin_min through the second current command Iin_ref, the driver circuit 2 is disabled. Therefore, the pulse wave of the PWM signal PWM cannot drive the power switches (SH, SL, S1, S2) since the driver circuit 2 is disabled.

Furthermore, the current controller 36 of the controller 3 actually continuously generates the PWM signal PWM based on the voltage command Vc. Especially in the burst mode in the interval I, the PWM signal PWM is continuously generated only in the specific time period T1. That is, in the general burst mode, the pulse wave of the PWM signal PWM will actually be more than the pulse wave in the specific time period T1 in FIG. 4. In the general burst mode, besides the pulse wave located near the peak of the waveform of the input voltage Vin, the pulse wave located near the zero point of the waveform of the input voltage Vin is also included. However, as shown in FIG. 2B, when the load is light enough to a certain extent (i.e., no load or light load), the burst mode of the output voltage Vout is combined to make the input current Iin reach the peak value of the waveform of the input voltage Vin, and be greater than the predetermined threshold Iin_min, the driver circuit 2 is enabled. Therefore, in FIG. 4, only during the specific time period T1 and the input current Iin (current waveform) is correspondingly greater than the predetermined threshold Iin_min, the switching of the power switches (SH, SL, S1, S2) is operated to make the energy stored in the inductor L can be effectively transferred to the output capacitor Cout to correspondingly generate the input current Iin.

In the interval II, the current controller 36 determines that the effective value of the input current Iin of the power factor correction circuit 1 is between the current lower limit Iin_rms_min and the current upper limit Iin_rms_max through the first current command Iin_rms_ref, that is, it indicates that the power factor correction circuit 1 operates from no-load condition or light-load condition to medium-load condition. In this condition, the controller 3 leaves from the operation of the burst mode, the ripple of the output voltage Vout becomes smaller, and will no longer reach the voltage lower limit Vout_min and voltage upper limit Vout_max.

Since the controller 3 leaves from the operation of the burst mode, the enabling/disabling of the driver circuit 2 is no longer limited to the specific time period T1. When the current controller 36 of the controller 3 determines that the instantaneous value of the input current Iin of the power factor correction circuit 1 is correspondingly lower than the predetermined threshold Iin_min through the second current command Iin_ref, the driver circuit 2 is disabled, and the pulse wave of the PWM signal PWM cannot drive the power switches (SH, SL, S1, S2) since the driver circuit 2 is disabled. Conversely, when the current controller 36 determines that the instantaneous value of the input current Iin of the power factor correction circuit 1 is correspondingly greater than the predetermined threshold value Iin_min through the second current command Iin_ref, the driver circuit 2 is enabled. When the driver circuit 2 is enabled, the driver circuit 2 drives the power switches (SH, SL, S1, S2) based on the pulse wave of the PWM signal PWM to operate the switching of the power switches (SH, SL, S1, S2) so that the energy stored in the inductor L is transferred to the output capacitor Cout.

In the interval III, the current controller 36 determines that the effective value of the input current Iin of the power factor correction circuit 1 is correspondingly greater than the current upper limit Iin_rms_max through the first current command Iin_rms_ref, that is, it indicates that the power factor correction circuit 1 operates from medium-load condition to heavy-load condition. Since the power factor correction circuit 1 operates under heavy load, the energy required by the load 200 is relatively large so that the current controller 36 of the controller 3 continuously enables the driver circuit 2. The driver circuit 2 continuously drives the power switches (SH, SL, S1, S2) based on the pulse wave of the PWM signal PWM to operate the switching of the power switches (SH, SL, S1, S2) so that the energy stored in the inductor L is continuously transferred to the output capacitor Cout.

Figure 5:
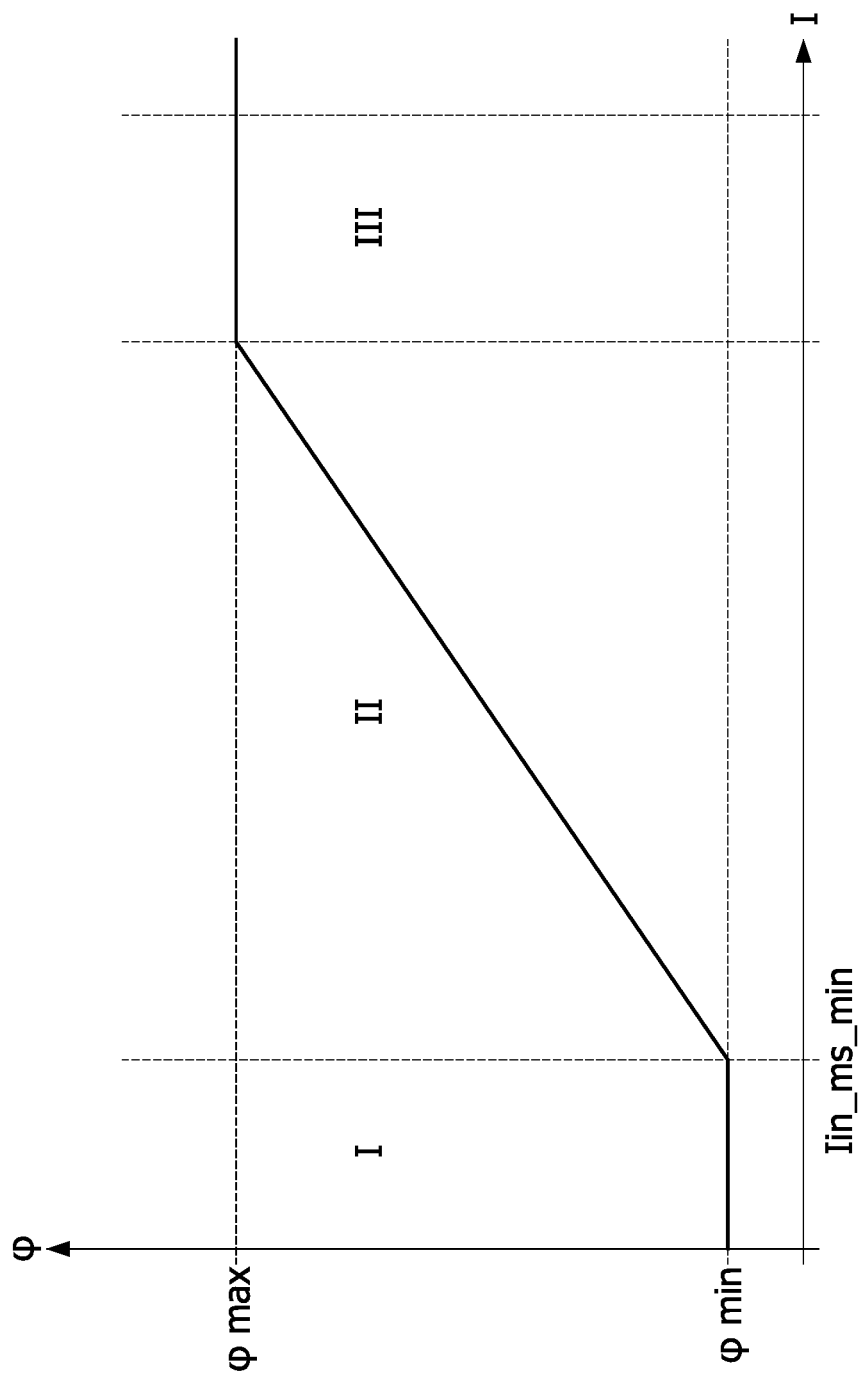
FIG. 5 is a curve diagram of a conduction phase angle interval of an input current according to the present disclosure.

Please refer to FIG. 5, which shows a curve diagram of a conduction phase angle interval of an input current according to the present disclosure, and also refer to FIG. 2A to FIG. 4. The intervals I, II, and III in FIG. 5 correspond to the intervals I, II, and III in FIG. 4 respectively, and the curve in FIG. 5 refers to the width of the conduction phase angle interval φ in FIG. 2B. In the interval I, since the effective value of the input current Iin of the power factor correction circuit 1 is correspondingly lower than the current lower limit Iin_rms_min, the conduction phase angle interval φ is maintained at a minimum interval φmin. In the interval II, since the load gradually increases, the effective value of the input current Iin of the power factor correction circuit 1 is between the current lower limit Iin_rms_min and the current upper limit Iin_rms_max so that the conduction phase angle interval q is between the minimum interval φmin and a maximum interval φmax. In the interval III, due to the heavy load, the effective value of the input current Iin of the power factor correction circuit 1 is correspondingly greater than the current upper limit Iin_rms_max so that the conduction phase angle interval φ is maintained at the maximum interval φmax. In particular, the maximum interval φmax usually refers to the interval in which the driver circuit 2 is continuously enabled, which means that the interval may be 180 degrees; the minimum interval φmin may be designed according to the specifications of the power factor correction circuit 1 (such as but not limited to 15 degrees).

Figure 6A:
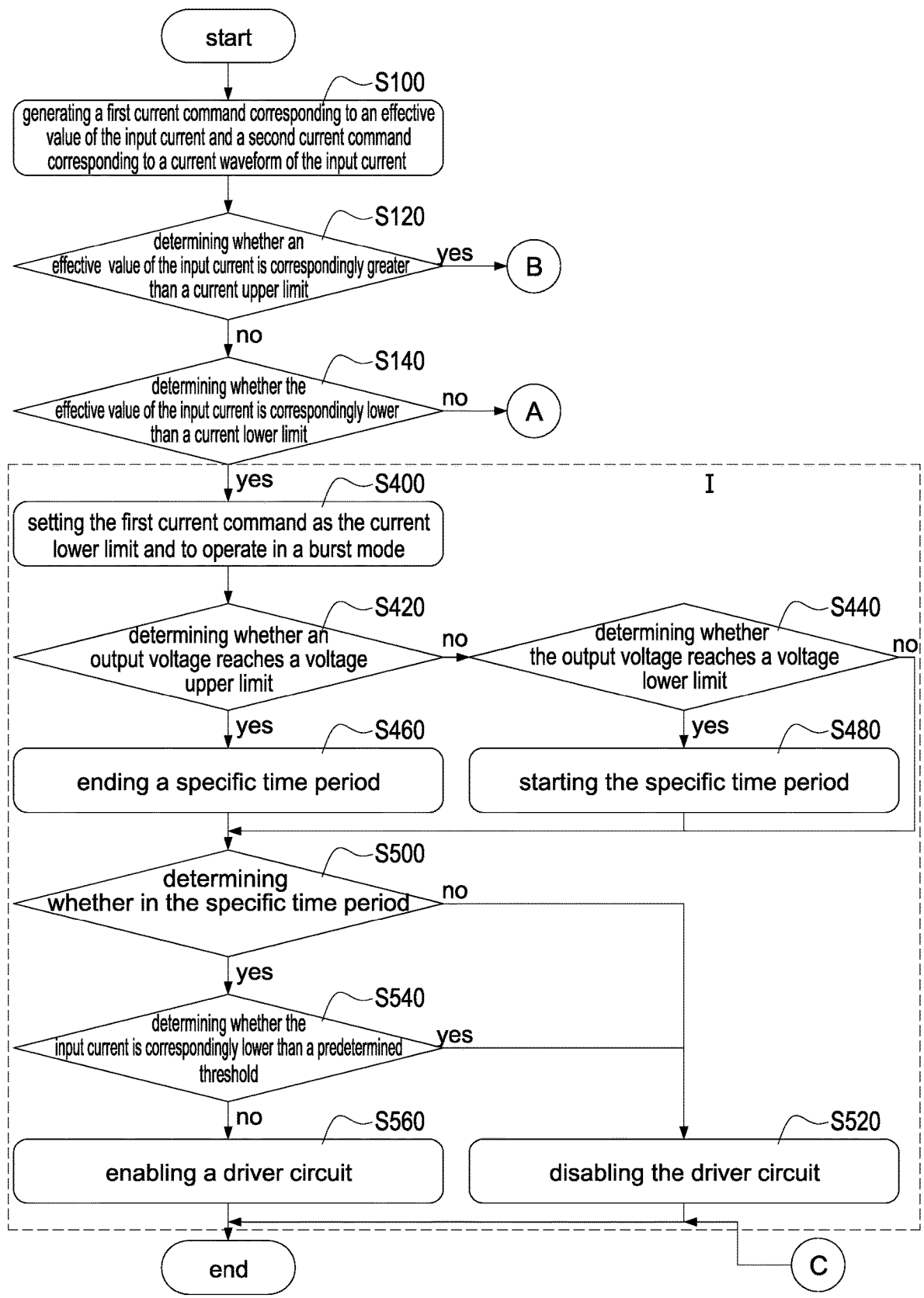
FIG. 6A is a flowchart of a method of operating the power converter with reduced power consumption in an interval I according to the present disclosure.
Figure 6B:
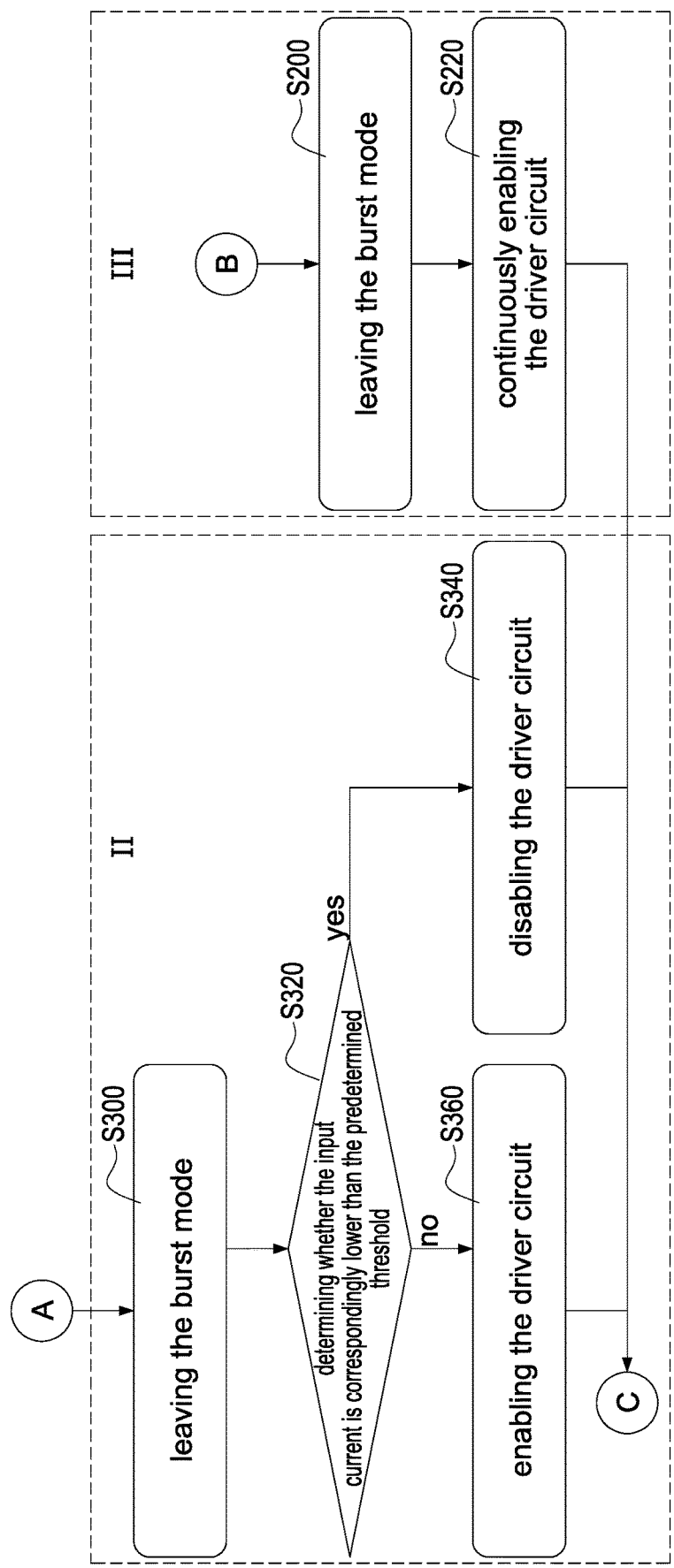
FIG. 6B is a flowchart of the method of operating the power converter with reduced power consumption during an interval II and an interval III according to the present disclosure.

Please refer to FIG. 6A, which is a flowchart of a method of operating the power converter with reduced power consumption in an interval I according to the present disclosure; please refer to FIG. 6B, which is a flowchart of the method of operating the power converter with reduced power consumption during an interval II and an interval III according to the present disclosure, and also refer to FIG. 2A to FIG. 5. The present disclosure mainly uses a method of controlling the conduction phase angle interval φ of the input current Iin to control the power factor correction circuit 1. The driver circuit 2 is enabled only when the input current Iin reaches near the peak value of the waveform of the input voltage Vin, and the driver circuit 2 is disabled at other times. Therefore, the method of operating the power converter includes steps of generating a first current command corresponding to an effective value of the input current and a second current command corresponding to a current waveform of the input current (S100). In particular, the method of generating the first current command Iin_rms_ref and the second current command Iin_ref may be referred to FIG. 3, and the detail description is omitted here for conciseness.

Afterward, determining whether the effective value of the input current is correspondingly greater than a current upper limit (S120). When the effective value of the input current Iin is correspondingly greater than the current upper limit Iin_rms_max, the operation in the interval III in FIG. 4 is executed, and the operation of the burst mode leaves (S200) and the driver circuit is continuously enabled (S220). Detailed operations of the above steps may be referred to the interval III in FIG. 4 and FIG. 5, and the detail description is omitted here for conciseness. When the determination result in step (S120) is "NO", step (S140) is then executed to determine whether the effective value of the input current is correspondingly lower than a current lower limit. When the effective value of the input current Iin is neither greater than the current upper limit Iin_rms_max nor lower than the current lower limit Iin_rms_min, that is, when the determination result in step (S140) is "NO", the operation in the interval II in FIG. 4 is executed, and the operation of the burst mode leaves (S300).

Afterward, determining whether the input current is correspondingly lower than a predetermined threshold (S320). When the instantaneous value of the input current Iin (current waveform) of the power factor correction circuit 1 is correspondingly lower than the predetermined threshold Iin_min, the driver circuit is disabled (S340). The pulse wave of the PWM signal PWM cannot drive the power switches (SH, SL, S1, S2) since the driver circuit 2 is disabled. Conversely, when the instantaneous value of the input current Iin (current waveform) of the power factor correction circuit 1 is correspondingly greater than the predetermined threshold Iin_min, the driver circuit is enabled (S360). When the driver circuit 2 is enabled, the driver circuit 2 can drive the power switches (SH, SL, S1, S2) based on the pulse wave of the PWM signal PWM to operate the switching of the power switches (SH•SL•S1•S2) through the PWM signal PWM so that the energy stored in the inductor L is continuously transferred to the output capacitor Cout.

Afterward, when the determination result in step (S140) is "YES", step (S400) is then executed to set the first current command as the current lower limit and to operate in the burst mode. The reason for setting the first current command Iin_rms_ref to the current lower limit Iin_rms_min is to avoid the first current command Iin_rms_ref from being too low and causing the current controller 36 to malfunction. Afterward, determining whether the output voltage reaches a voltage upper limit (S420). When the output voltage Vout does not reach the voltage upper limit Vout_max, it is determined whether the output voltage reaches a voltage lower limit (S440). When the output voltage Vout reaches the voltage upper limit Vout_max, the specific time period ends (S460). When the output voltage Vout reaches the voltage lower limit Vout_min, the specific time period starts (S480).

Afterward, determining whether in the specific time period (S500). When it is determined that it is not in the specific time period T1, the driver circuit is disabled (S520), and the pulse wave of the PWM signal PWM cannot drive the power switches (SH, SL, S1, S2) since the driver circuit 2 is disabled. When it is determined that it is in the specific time period T1, it is determined whether the input current is correspondingly lower than the predetermined threshold (S540). When it is determined that the instantaneous value of the input current Iin (current waveform) of the power factor correction circuit 1 is correspondingly lower than the predetermined threshold Iin_min, step (S520) is then executed, and the pulse wave of the PWM signal PWM cannot drive the power switches (SH•SL•S1•S2) since the driver circuit 2 is disabled. Conversely, when the determination result in step (S540) is "NO", the driver circuit is enabled (S560). When the driver circuit 2 is enabled, the driver circuit 2 can drive the power switches (SH, SL, S1, S2) based on the pulse wave of the PWM signal PWM so as to operate the switching of the power switches (SH•SL•S1•S2) through the PWM signal PWM so that the energy stored in the inductor L is continuously transferred to the output capacitor Cout. In one embodiment, the process steps not described in FIG. 6A and FIG. 6B may be referred to in conjunction with FIG. 3 to FIG. 5, and the detail description is omitted here for conciseness.

Although the present disclosure has been described with reference to the preferred embodiment thereof, it will be understood that the present disclosure is not limited to the details thereof. Various substitutions and modifications have been suggested in the foregoing description, and others will occur to those of ordinary skill in the art. Therefore, all such substitutions and modifications are intended to be embraced within the scope of the present disclosure as defined in the appended claims.

What is claimed is:

1. A power converter with reduced power consumption, configured to receive an input voltage and provide an output voltage to supply power to a load, the power converter comprising:
   a power factor correction circuit, comprising at least one inductor, at least one power switch, and an output capacitor, and configured to receive the input voltage,
   a driver circuit, coupled to the at least one power switch, and
   a controller, coupled to the driver circuit, and configured to provide a PWM signal to the driver circuit; wherein the driver circuit drives the switching of the at least one power switch based on the PWM signal so as to control the power factor correction circuit to convert the input voltage into the output voltage,
   wherein when the controller determines that an effective value of an input current of the power factor correction circuit is correspondingly lower than a current lower limit, a specific time period starts based on the output voltage reaching a voltage lower limit, and the specific time period ends based on the output voltage reaching a voltage upper limit; in the specific time period, the controller enables the driver circuit based on the input current being correspondingly greater than a predetermined threshold so as to operate the switching of the at least one power switch through the PWM signal.

2. The power converter as claimed in claim 1, wherein during the specific time period, the controller disables the driver circuit based on the input current being correspondingly lower than the predetermined threshold.

3. The power converter as claimed in claim 1, wherein the controller continuously generates the PWM signal, and shields the PWM signal continuously generated by the controller by disabling the driver circuit.

4. The power converter as claimed in claim 1, wherein the controller continuously enables the driver circuit when determining that the effective value is correspondingly greater than a current upper limit so as to operate the at least one power switch by the PWM signal.

5. The power converter as claimed in claim 4, wherein the controller disables the driver circuit when determining the effective value is between the current lower limit and the current upper limit based on the input current being correspondingly lower than the predetermined threshold; the controller enables the driver circuit based on the input current being correspondingly greater than the predetermined threshold to provide the PWM signal to operate the at least one power switch.

6. The power converter as claimed in claim 4, wherein the controller comprises:
   an error amplifier, coupled to the output capacitor, and configured to generate an error signal based on the output voltage and a reference voltage,
   a voltage controller, coupled to the error amplifier, and configured to generate a voltage command corresponding to the PWM signal based on the error signal, and
   a current controller, configured to generate the PWM signal based on the voltage command,
   wherein the controller is configured to set the current lower limit, the current upper limit, and the predetermined threshold; the current controller is configured to generate a first current command corresponding to the effective value based on the voltage command and the input current, and generate a second current command corresponding to the input current based on the voltage command and the input current.

7. The power converter as claimed in claim 6, wherein the controller is configured to determine whether the effective value is correspondingly lower than the current lower limit based on the first current command, and determine whether the input current is correspondingly greater than the predetermined threshold based on the second current command.

8. The power converter as claimed in claim 6, further comprising:
   a voltage detection circuit, coupled to the output capacitor, and configured to detect the output voltage so as to provide a first feedback voltage, and
   a current detection circuit, coupled to an input end of the power factor correction circuit, and configured to detect the input current to provide a second feedback voltage,
   wherein the error amplifier is configured to generate the error signal based on the first feedback voltage and the reference voltage, and the current controller is configured to generate the first current command and the second current command based on the second feedback voltage and the voltage command.

9. A method of operating a power converter with reduced power consumption, the power converter configured to receive an input voltage and provide an output voltage to supply power to a load; the power converter comprising a power factor correction circuit and a driver circuit, and the power factor correction circuit comprising at least one inductor, at least one power switch, and an output capacitor; the method comprising steps of:
- (a) determining that an effective value of an input current of the power factor correction circuit is correspondingly less than a current lower limit,
- (a1) starting a specific time period when the output voltage reaches a voltage lower limit,
- (a11) enabling the driver circuit when the input current is correspondingly greater than a predetermined threshold to provide a PWM signal to drive the switching of the at least one power switch,
- (a12) disabling the driver circuit when the input current is correspondingly lower than the predetermined threshold, and
- (a2) ending the specific time period when the output voltage reaches a voltage upper limit.

10. The method of operating the power converter as claimed in claim 9, further comprising steps of:
- (b) determining that the effective value is correspondingly greater than a current upper limit, and
- (b1) continuously enabling the driver circuit to operate the at least one power switch by the PWM signal.

11. The method of operating the power converter as claimed in claim 9, further comprising steps of:
- (c) determining that the effective value is between the current lower limit and the current upper limit,
- (c1) enabling the driver circuit when the input current is correspondingly greater than the predetermined threshold, and
- (c12) disabling the driver circuit when the input current is correspondingly lower than the predetermined threshold.

12. The method of operating the power converter as claimed in claim 9, further comprising steps of:
- generating an error signal based on the output voltage and a reference voltage,
- generating a voltage command corresponding to the PWM signal based on the error signal, and generating the PWM signal based on the voltage command,
- generating a first current command corresponding to the effective value based on the voltage command and the input current, and
- generating a second current command corresponding to the input current based on the voltage command and the input current.

13. The method of operating the power converter as claimed in claim 12, further comprising steps of:
- determining whether the effective value is correspondingly lower than the current lower limit based on the first current command, and
- determining whether the input current is correspondingly greater than the predetermined threshold based on the second current command.

14. The method of operating the power converter as claimed in claim 12, further comprising steps of:
- detecting the output voltage to provide a first feedback voltage, and generating the error signal based on the first feedback voltage and the reference voltage, and
- detecting the input current to provide a second feedback voltage, and generating the first current command and the second current command based on the second feedback voltage and the voltage command.

15. The method of operating the power converter as claimed in claim 12, further comprising steps of:
- continuously generating the PWM signal based on the voltage command, and
- shielding the PWM signal by disabling the driver circuit.

* * * * *